Patented Sept. 4, 1934

1,972,135

UNITED STATES PATENT OFFICE 1,972,135

CELLULOSE DERIVATIVES AND THEIR MANUFACTURE

Henry Dreyfus, London, England

No Drawing. Application January 25, 1933, Serial No. 653,473. In Great Britain February 12, 1932

8 Claims. (Cl. 260—152)

This invention relates to cellulose derivatives and methods for their manufacture. In U. S. Patent No. 1,502,379 I have described the manufacture broadly of oxyalkyl ethers of cellulose and also the manufacture of mixed alkyl-oxylated ethers of mixed aralkyl-oxyalkyl ethers of cellulose. The said specification further includes the manufacture of mixed alkyl-aralkyl-oxyalkyl ethers of cellulose.

The present invention relates to improved methods for the manufacture of such mixed ethers of cellulose. In the said specification I have more particularly indicated the employment of halogen hydrins as etherifying agents in presence of caustic alkali. I have now found that improved products both from the point of view of heat test and also in respect of their solubility characteristics may be produced by effecting the oxy-alkylation of the cellulose by means of olefine oxides in presence of ammonia or of organic bases. The alkylation or aralkylation may likewise be effected in the presence of basic reagents.

The introduction of the oxyalkyl groups in accordance with the present invention may take place either before, after or together with the introduction of the alkyl and/or aralkyl groups. I prefer to introduce the alkyl and/or aralkyl groups prior to the introduction of the oxyalkyl groups. Such introduction of alkyl or aralkyl groups may take place substantially on the lines indicated in British Patent No. 164,374 and U. S. Patents Nos. 1,451,330 and 1,451,331, though it will be appreciated that any suitable base, for example ammonia or an organic base, may be used instead of the caustic alkali particularly specified in the said specifications.

The oxyalkylation as previously indicated is conducted in accordance with the present invention with the aid of olefine oxides and in presence of ammonia or an organic base. Tertiary organic bases, such as dimethyl aniline, diethyl hexylamine, pyridine, quinoline and the like may be used, but I prefer to employ the primary or secondary organic bases, for instance methylamine, dimethylamine, ethylamine and diethylamine, amylamine, hexylamine and dihexylamine, the amines obtainable by chlorination of paraffin hydrocarbons followed by amidation with ammonia or alkylamines and similar products obtainable from higher fatty acids, and in the aromatic series benzylamine and its homologues and substitution products and particularly N-alkyl substitution products, dibenzylamine, methyl aniline and other N-alkylated or aralkylated aromatic or aralkyl amines and piperidine. Instead of using the organic base directly its reaction product with the alkylene oxide, as for example oxyethylmethylamine or oxyethylethylamine etc. may be used.

The basic substances may be employed in any suitable amount. Where the base is very weak it is, in general, desirable to employ a relatively greater quantity. Thus the proportion of base may be as much as 50–100% or more calculated on the weight of the cellulose or cellulose ether employed. In general, however, smaller amounts are preferable, e. g. proportions of 30–20–10% or even less.

The reaction with the etherifying agent may be carried out at ordinary or reduced pressure, but is preferably conducted under increased pressure, for instance pressures of the order of 5, 10 or 20 atmospheres or more. Rise of temperature facilitates the conduct of the reaction and it is in general desirable to employ temperatures of about 80° to 120° C. or 150° C. The reaction may be carried out with the reagents in the liquid phase, under pressure if this be necessary to maintain the liquid phase, or where possible the etherifying agent, with or without the organic base, may be applied in the vapour or gaseous phase. In the event that the etherifying agent only is employed in the gaseous or vapour phase then the cellulose may be suitably impregnated with the ammonia or organic base previous to passage of the alkylene oxide or other etherifying agent, such impregnation being effected if desired under pressure. In gaseous phase reactions the cellulose may be more or less dry and may be treated in a current of the etherifying agent, or alternatively it may be suspended in a suitable medium which may consist of the organic base or may contain the organic base in solution in an inert medium, such as hydrocarbon, and the etherifying agent may then be passed through. Gaseous phase reactions are preferably conducted under pressure, for example pressure produced with the aid of the alkylene oxide itself. Similarly liquid phase reactions may be effected in presence or absence of hydrocarbons or other inert media. The medium employed will usually be a non-solvent for the cellulose ether produced. In reactions carried out in the gaseous phase the gaseous materials may be employed either alone or in admixture with an inert gas, e. g. nitrogen or carbon dioxide.

The cellulose starting material may be cotton linters or other form of waste cotton, sulphite pulp, sulphate pulp or soda pulp, preferably purified from residual lignone products, as for example by the alkaline purifying step of my U. S. Patent No. 1,711,110.

As examples of alkylene oxide etherifying agents which may be used in accordance with the invention I may instance ethylene oxide, propylene oxide, butylene oxide, epichlorhydrin, glycide and glycidic acid.

The mixed cellulose ethers produced may be used for any purpose to which cellulose esters or ethers have in the past been applied, for example to the manufacture of artificial silk by wet or dry spinning methods, ribbons, films, lacquers, dopes, varnishes, plastics, moulding powders, etc., or may be further etherified or esterified, either on the nuclear hydroxyl groups, if any are free, or on the ether hydroxy groups, and the products employed for such purposes.

The following examples are given by way of illustration only and are not to be considered as limiting the invention in any way.

*Example 1*

100 parts of ethyl cellulose containing 1–1½ ethyl groups per $C_6H_{10}O_5$ unit are mixed with 75 parts of ethylene oxide and 50 parts of aqueous ammonia (containing about 20% ammonia) and placed in an autoclave. The temperature is raised to 100° C. and maintained there for several hours. When the reaction is complete any excess volatile reagents may be removed by reducing the pressure.

*Example 2*

100 parts of butyl cellulose containing 1½–2 butyl radicles per $C_6H_{10}O_5$ unit are treated with propylamine under such conditions that a homogenous mass containing 10–15% of propylamine is obtained. The material is then placed in an autoclave, the temperature is raised to 100° C. and propylene oxide is introduced under pressure until it is no longer absorbed by the materials. The reaction product is then carefully washed and dried.

*Example 3*

100 parts of benzyl cellulose are placed in an autoclave with 20 parts of oxy-ethylmethylamine (produced by reacting methylamine with ethylene oxide) and an excess of ethylene oxide. The temperature is raised to 120° C. and maintained there for several hours. The hydroxyethyl benzyl cellulose produced is then carefully washed and dried and may be employed for any desired purpose.

It is to be understood that in the following claims, the term "alkyl" includes "aralkyl" and that the esters formed may contain more than one alkyl group.

What I claim and desire to secure by Letters Patent is:—

1. Process for the manufacture of mixed cellulose ethers, comprising treating alkyl ethers of cellulose with alkylene oxides in the presence of a base of the formula $NH R_1R_2$ where $R_1$ and $R_2$ are hydrogen or alkyl residues, in the absence of metallic bases.

2. Process for the manufacture of mixed cellulose ethers, comprising treating alkyl ethers of cellulose with alkylene oxides in the presence of methylamine and in the absence of metallic bases.

3. Process for the manufacture of mixed cellulose ethers, comprising treating alkyl ethers of cellulose with ethylene oxide in the presence of a base of the formula $NH R_1R_2$ where $R_1$ and $R_2$ are hydrogen or alkyl residues, in the absence of metallic bases.

4. Process for the manufacture of mixed cellulose ethers, comprising treating alkyl ethers of cellulose with ethylene oxide in the presence of methylamine and in the absence of metallic bases.

5. Process for the manufacture of mixed cellulose ethers, comprising treating alkyl ethers of cellulose with epichlorhydrin in the presence of a base of the formula $NH R_1R_2$ where $R_1$ and $R_2$ are hydrogen or alkyl residues, in the absence of metallic bases.

6. Process for the manufacture of mixed cellulose ethers, comprising treating alkyl ethers of cellulose with epichlorhydrin in the presence of methylamine and in the absence of metallic bases.

7. Process for the manufacture of mixed cellulose ethers, comprising alkylating cellulose and treating the resulting ethers with alkylene oxides in the presence of a base of the formula $NH R_1R_2$ where $R_1$ and $R_2$ are hydrogen or alkyl residues, in the absence of metallic bases.

8. Process for the manufacture of mixed cellulose ethers, comprising alkylating cellulose and treating the resulting ethers with ethylene oxide in the presence of methylamine, in the absence of metallic bases.

HENRY DREYFUS.

CERTIFICATE OF CORRECTION.

Patent No. 1,972,135. September 4, 1934.

HENRY DREYFUS.

It is hereby certified that error appears in the printed specification of the above numbered patent requiring correction as follows: Page 1, line 5, for "alkyl-oxylated" read alkyl-oxyalkyl; and that the said Letters Patent should be read with this correction therein that the same may conform to the record of the case in the Patent Office.

Signed and sealed this 25th day of September, A. D. 1934.

Leslie Frazer (Seal)

Acting Commissioner of Patents.